June 20, 1967

R. C. HOFFMAN ET AL

3,326,460

VISUAL INDICATOR FOR CASH REGISTER

Filed Jan. 10, 1966

Inventors:
Robert C. Hoffman
Robert H. Schnakenberg
Gradolph Love & Rogers
Attorneys

Inventors:
Robert C. Hoffman
Robert H. Schnakenberg
Gradolph
Love & Rogers
Attorneys

United States Patent Office 3,326,460
Patented June 20, 1967

3,326,460
VISUAL INDICATOR FOR CASH REGISTER
Robert C. Hoffman and Robert H. Schnakenberg, Park Ridge, Ill., assignors to Victor Comptometer Corporation, Chicago, Ill., a corporation of Illinois
Filed Jan. 10, 1966, Ser. No. 519,541
14 Claims. (Cl. 235—8)

The present invention relates to improvements in visual indicators for cash registers, and in particular for electric powered mechanically operated registers.

It has been the practice in cash registers to provide for a mechanism to be driven from the main operating mechanism of the register to operate the rollers bearing the visual indicia of the item, subtotal, and total amounts, as well as the code carrying indicia. More accurately, it can be said that the mechanism which sets up the amount in the cash register which is transferred to the accumulator for storage, and which transfers an amount from the accumulator for totaling purposes, drives the rolls bearing the numerical value of the transaction, sub-total, total and also the code which indicates, among other things, the department of the store from which the item is purchased, the classification of merchandise, whether the item registered is a subtotal or total, whether the item registered is a tax imposed by the local government, or whether the amount is to be credited to the customer, such as the charge or a cash sale.

In order to make such machines effectively operative, it is necessary that the mechanism which operates the machines be relatively heavy and capable of delivering the power and force necessary to drive the indicator rolls and to stop them at a desired position in order accurately to indicate to the customer the amount, the code, and the operation.

This means that it is not possible in cash registers of this type to use the mechanisms now available in commercial adding, subtracting, and calculating machines. These machines are constructed to be as light in weight as possible to provide high speed operation and adequate durability, but are also constructed so as to be low in manufacturing cost and have as few parts as is consistent with the desired utility of the machine. In order for them to have high speed operation, the parts must be as light as possible in order to keep to a minimum the mass of moving parts. These parts, however, are not ordinarily strong enough to be used in another function, such as operating the indicator dials or perhaps other parts of the cash register to give full effect to the transaction. Therefore, while the desirability of utilizing the designs of these machines has been appreciated, utilizing the actual parts available has not heretofore been possible.

Consequently, some cash registers use separate electrical mechanisms for setting the indicator dials.

It is one of the principal objects of the present invention to provide a new and improved cash register wherein the mechanism of commercially available adding, subtracting, and calculating machines is utilized to control the position to which a secondary mechanism may move in order to set the indicator dials to show the amount "rung up" for each item, subtotals, totals, tax, and the function the machine is undergoing at the time, and the code for the transaction.

Another object is to provide a new and improved cash register having separately powered sections for accumulating and storing totals and for operating the visual indicator rollers and the positioning of the mechanism in the visual indicator roller power section being controlled from the adding section.

Other objects and advantages will become apparent from the following description taken in conjunction with the drawings, wherein.

General organization

Figure 1:
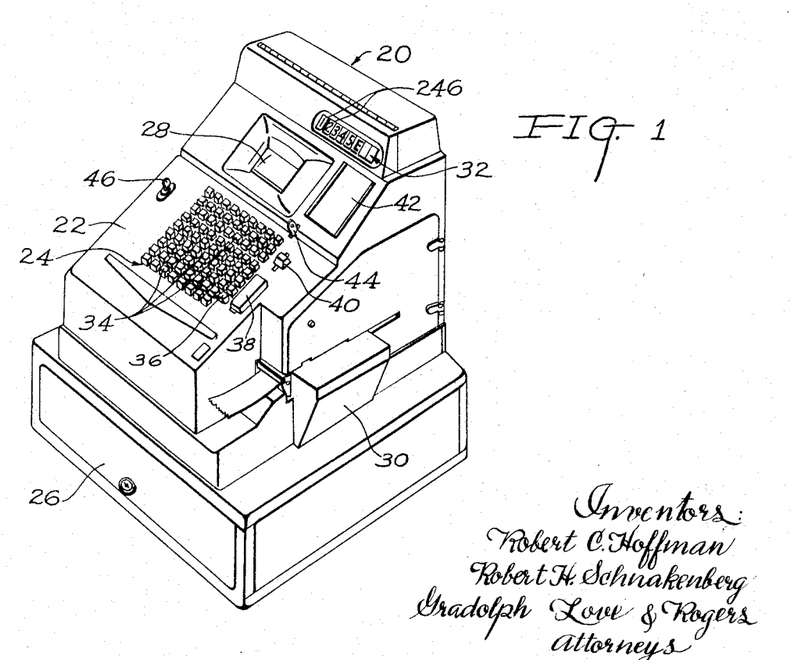
FIG. 1 is a perspective view of a cash register of the type embodying the present invention.

Referring first to FIG. 1, it will be observed that the cash register indicated generally at 20 has a main housing 22, a keyboard 24, a cash drawer 26, a permanent tape 28 which is visual through a window, a side printer section 30, and a visual transaction indicator 32. The indicator is seen in FIG. 1 as being viewable only from the side of the operator, but it is well known in the art that it be viewable both from the operator or clerk side and the opposite side for the customer. The side printer preferably is of the type which will print either cash receipts on a tape, or will print the amount and validate a charge ticket, and may be of the type disclosed in Hoffman et al. Patent No. 3,186,636, dated June 1, 1965, for a receipt printing and validating device.

The keyboard contains a plurality of amount keys 34 arranged in columns corresponding to the units, tens, dollars, etc., and a column of function keys 36 which control a visual indicator roller and are for the purpose of controlling the printing on the permanent tape of particular functions such, for example, as the local tax, groceries, produce, meat, refund for empty bottles, amount rendered, and the like. The keyboard also contains a conventional motor bar 38 which is pressed to initiate a machine cycle. Adjacent the motor bar 38 is a total-subtotal control key 40 which is pulled forward to total the items in the accumulator to indicate the total on the visual indicator 32 and print the total on both the permanent tape and the customer tape. When pivoted rearwardly, the key 40 will control the cash register to print the subtotal on the permanent tape and the customer receipt and to indicate the subtotal on the visual indicator 32 so that the operator may compute the applicable tax and do whatever else is necessary to complete the computation. To this end the tax table holder 42 is available for ready reference next to the permanent tape and immediately below the visual indicator.

The keyboard also includes a correction key 44 and a lock key 46, both of which are well known in the art and the functions of which are well understood.

Figure 2:
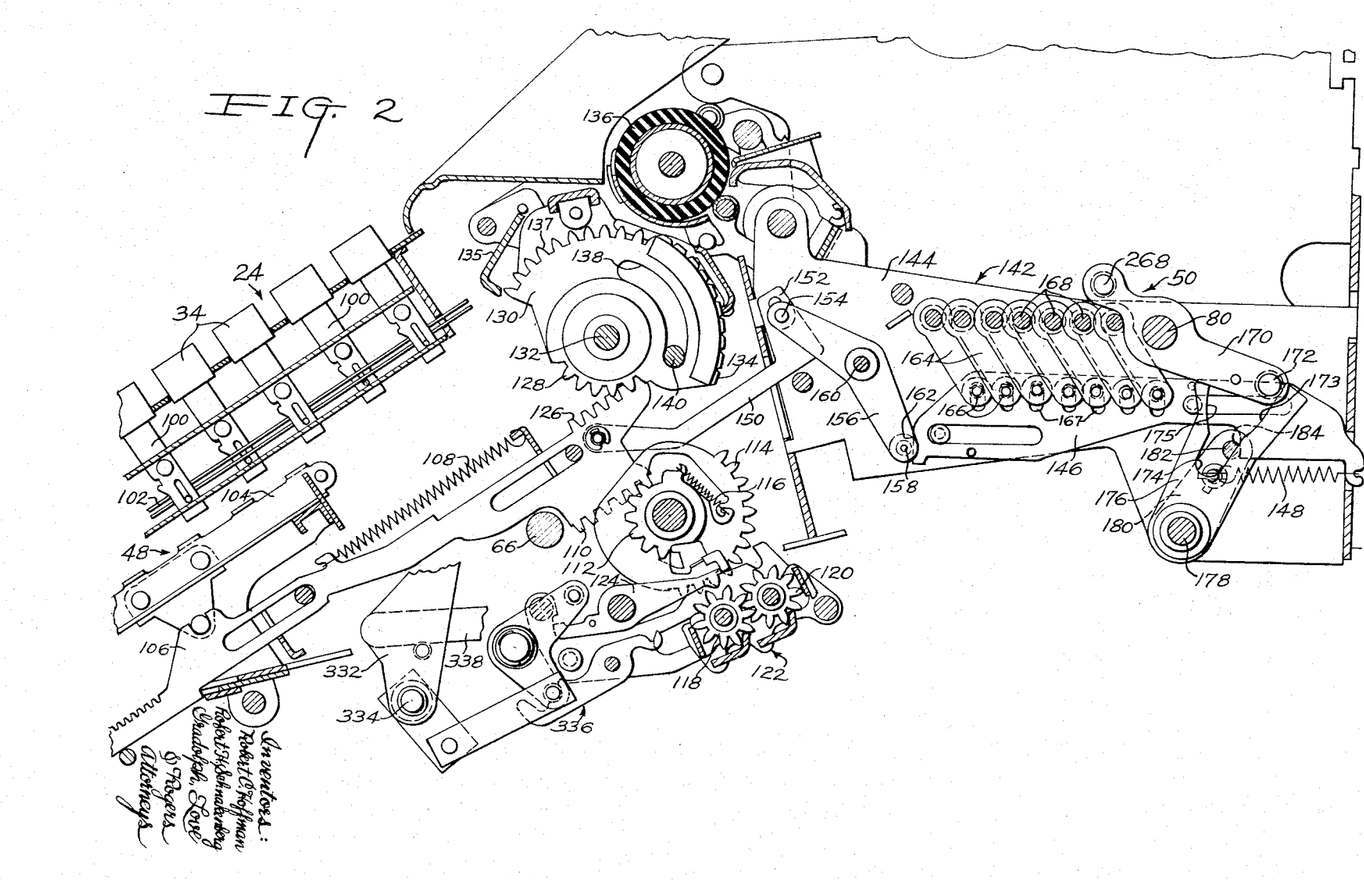
FIG. 2 is a longitudinal medial sectional view through the cash register showing a substantial portion of the mechanism in the adding and accumulating sections and a portion of the mechanism which controlls the setting of the indicator dials, and is taken along the line 2—2 of FIG. 4, looking in the direction of the arrows.
Figure 3:
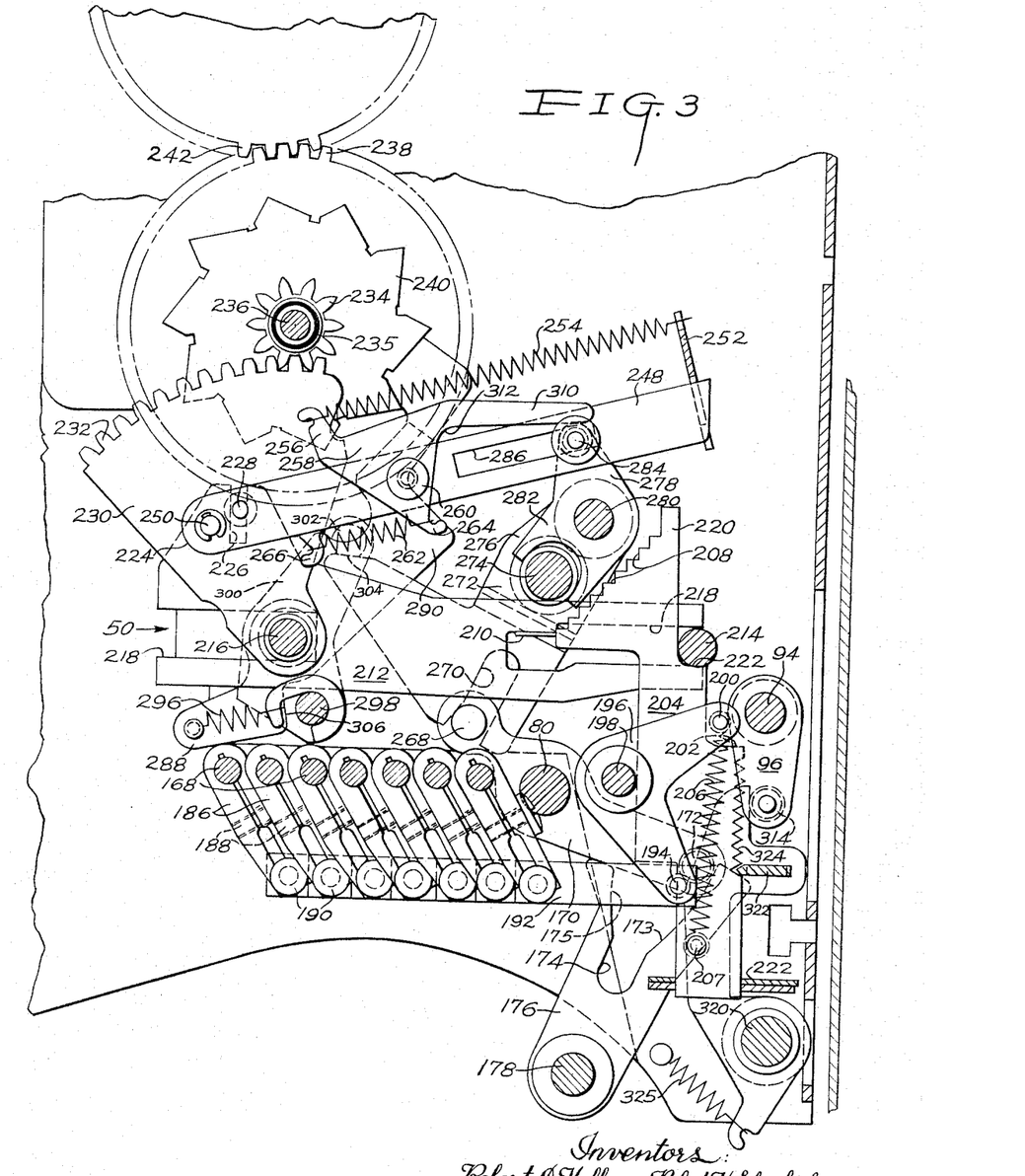
FIG. 3 is an enlarged longitudinal sectional view taken in a plane parallel to that of FIG. 2, but offset therefrom, showing another portion of the mechanism for controlling the setting of the indicator dials, and is taken along the lines 3—3 of FIGS. 4 and 5, looking in the direction of the arrows.

Referring now to FIGS. 2 and 3, it will be seen that the cash register 20 includes an adding and accumulating section 48 which is at the forward portion of the machine and extends up through the mechanism for printing the permanent tape, and an amount indicating section 50 which is to the rear and to the right of the machine as seen by the operator.

Power drive

Figure 8:
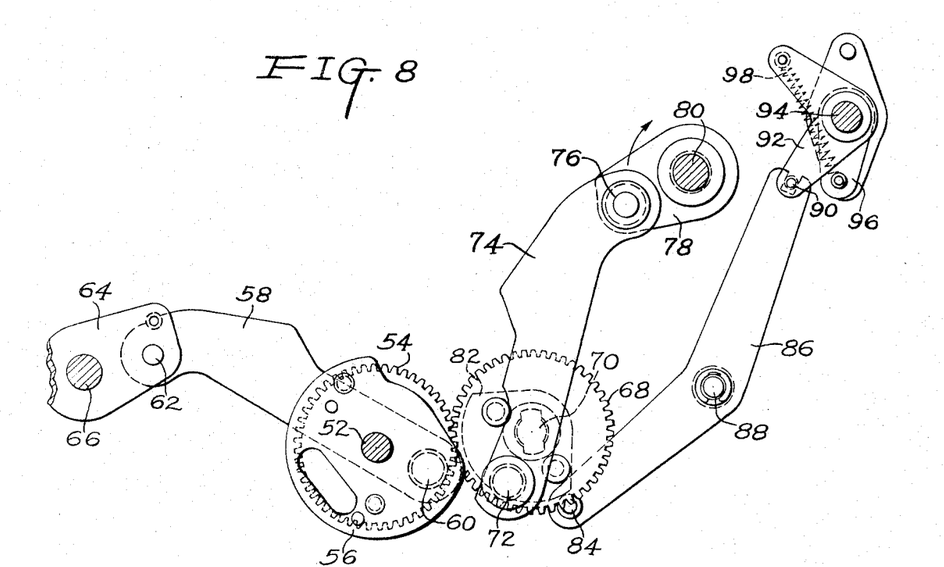
FIG. 8 is a longitudinal sectional view showing the drive mechanism to operate the main shaft for powering the adding and accumulating section of the cash register and the main shaft for operating the visual amount indicating section of the cash register.

FIG. 8 illustrates the power drive for the cash register and shows a shaft 52 driven by a one-way clutch and drive mechanism of the type illustrated in James G. Woodier Patent No. 2,995,227, dated Aug. 8, 1961. This mechanism, upon energization, will drive the shaft 52 for one single revolution in the counterclockwise direction (FIG. 8). The shaft 52 has a gear 54 affixed thereto as well as a cam and drive plate 56. A driving crank arm 58 is pivotally connected by a pin 60 to the drive plate 56 and it in turn is pivotally connected at 62 to a short arm 64 which is fixed on the main drive shaft 66 for the adding and accumulating section 48 of the cash register. The arrangement is such that as the gear 54 is driven in the counterclockwise direction through a single revolution, the linkage of the arms 58 and 64 will rotate the shaft 66 in the counterclockwise direction an angular distance of 98° 50', and then in the clockwise direction an angular distance of 98° 50' to restore it to its initial or "start" position.

The gear 54 is meshed with a gear 68 mounted on a shaft 70 and which has pivotally connected thereto at 72 a crank arm 74. The outer end of the crank arm 74 is pivotally connected at 76 to an arm 78 fixed to a rotatable second main shaft 80 for the amount indicating section 50 of the cash register.

A cam 82 is fixed to the gear 68 and has riding against the periphery thereof a roller 84 carried on the lower end of an arm 86 pivoted intermediate its ends at 88. The upper end of the arm 86 is forked to receive a pin 90 carried on one end of a bell crank 92 which is fixed on a shaft 94. Also fixed on this shaft 94 is an arm 96. A spring 98 interconnects the outer end of arm 96 and the second arm of the bell crank 92 and urges them to the position shown in FIG. 8, thus holding the roller 84 against the periphery of the cam 82.

Adding and accumulator section

The adding and accumulator section 48 is most clearly illustrated in FIG. 2, and as illustrated is of the type shown in Thomas O. Mehan Patent No. 2,475,510, dated July 5, 1949.

The numeral keys 34 have stems 100 which are mounted for rectilinear movement in a keyboard assembly 102, and when depressed they are latched until released at the end of the cycle. The stems 100 are adapted to be engaged by lateral lugs of actuators 104, there being one actuator for each column. Each actuator is connected to a rack 106 which is mounted for rectilinear movement and biased rearwardly by a spring 108. The rack 106 has a first rack section 110 which is engageable with a transfer gear sector 112 connected to a second gear sector 114 through a lost motion spring connection 116. The gear sector 114 is adapted to be engaged with pinions 118 and 120 of an accumulator 122. The accumulator is movable into and out of engagement with the gear sector 114 in accordance with the function indicated of adding, subtracting, subtotal taking, or total taking. A tens transfer pawl 124 functions in the known manner to carry over to the next higher column the value 1 transferred from the adjacent lower column where required. The accumulator 122 is moved into and out of engagement with the gear sector 114 by a cam and linkage mechanism operated from the main shaft 66. This mechanism is well known in this art and forms no part of the present invention.

The rack bar 106 has a second rack 126 thereon engageable with a gear sector 128 which is part of the type carrying sector 130 which is mounted for pivotal movement on a shaft 132. As the rack bar 106 moves rearwardly in accordance with the motion imparted through the spring 108 and limited by the positioning of the actuator 104, the type sector properly positions the type 134 to be opposite the platen 136 and the inked ribbon (not shown). At the midpoint in the cycle the platen 136 is moved toward the type sectors 130 and the amount and proper code are printed on the paper tape entrained about the platen 136. During this printing time the type sectors are locked against movement by a justifier or rectifier 135, operated from the main shaft 66, engageable with sector teeth 137.

The type sectors 130 are formed with arcuate slots 138 through which a restoring bail 140 extends. At the start of the machine cycle a cam and linkage mechanism operated from the main shaft 66 moves the bail in the counterclockwise direction to the upper end of the slot 138 thus permitting each of the sectors 130 to be movable through the full extent of the movement but which is in effect limited by the positioning of the actuators 104. Shortly after the start of the second half of the machine cycle, the bail 140 is moved in the clockwise direction thus restoring the type sectors 130 to the illustrated position moving the rack bars 106 and actuators 104 forwardly in the machine where they are latched to await the subsequent cycle.

The amount indicating section rack follower assembly

Referring primarily to FIGS. 2 and 3, there is mounted to the rear of the adding and accumulator section 48 a rack follower assembly 142 which is mounted on a subframe including a pair of side plates 144. The rack follower assembly includes a rack follower slide 146 corresponding to each rack bar 106 and mounted for rectilinear movement only on pin and slot mounts. The rack follower slides 146 are urged forwardly of the machine or to the left as seen in FIG. 2 by power springs 148, their forward movement being determined by the rearward movement of the actuators 104 and rack bars 106. A link 150 is pivotally connected to the rear of each rack bar 106 and extends rearwardly therefrom. Each link has an upstanding arm 152 which has a pin and slot pivotal connection 154 at one end of a rack follower 156 which has a stop pin 158 at its lower end, the rack followers being pivotally mounted on a common shaft 160 carried by the side plates 144. The pins 158 are adapted to be engaged by the end faces 162 of the rack follower slides 146, it being observed from FIGS. 2 and 4 that there is in the normal position a slight space between the pin 158 and the face 162 to prevent the follower slides from interference with the motion of the rack bars 106 and the actuators 104.

Figure 4:
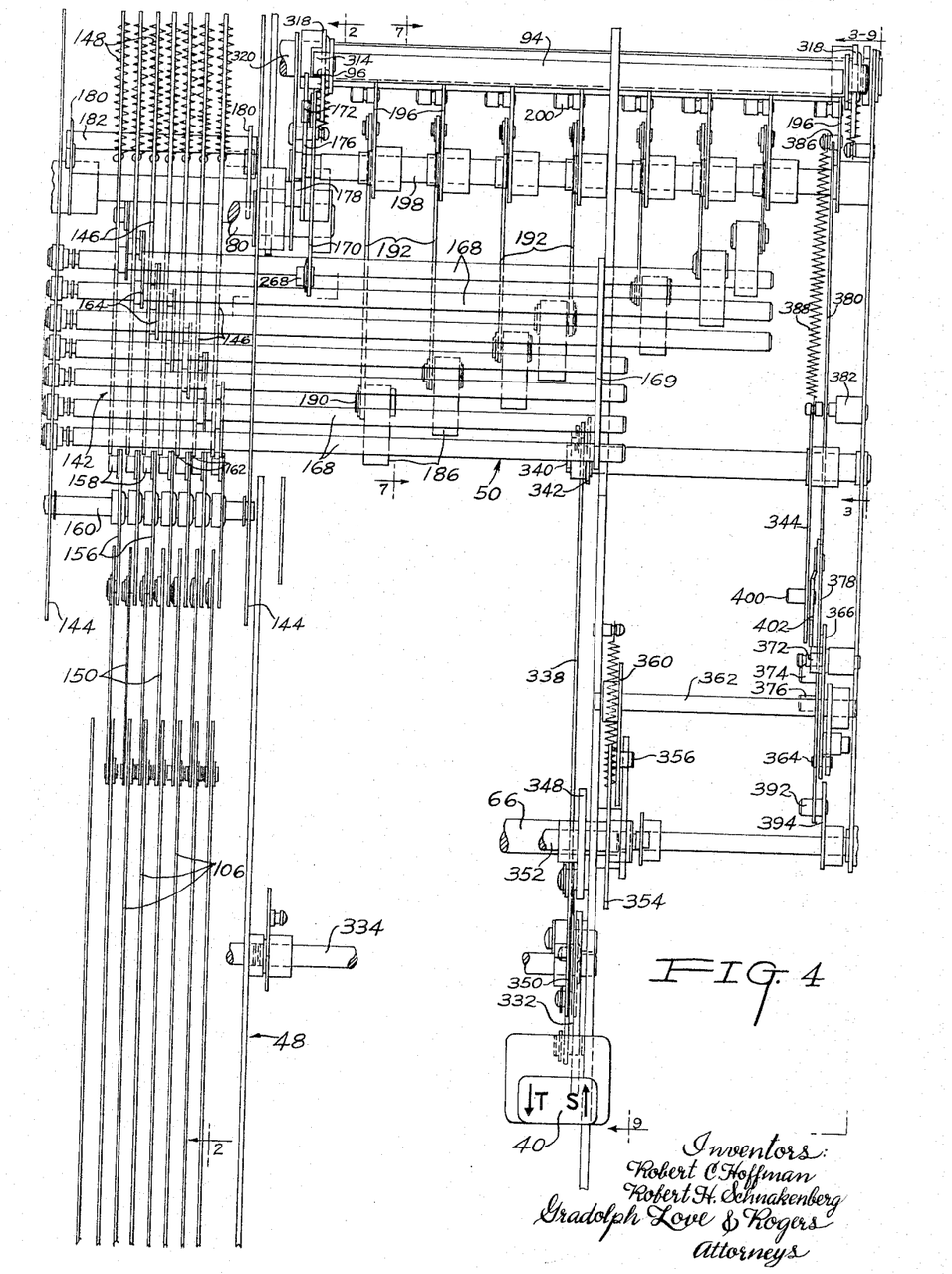
FIG. 4 is a plan view, taken below the indicator rolls, showing the slides, actuators, transfer mechanisms, and a portion of the mechanism for controlling the setting of the indicator rolls.
Figure 5:
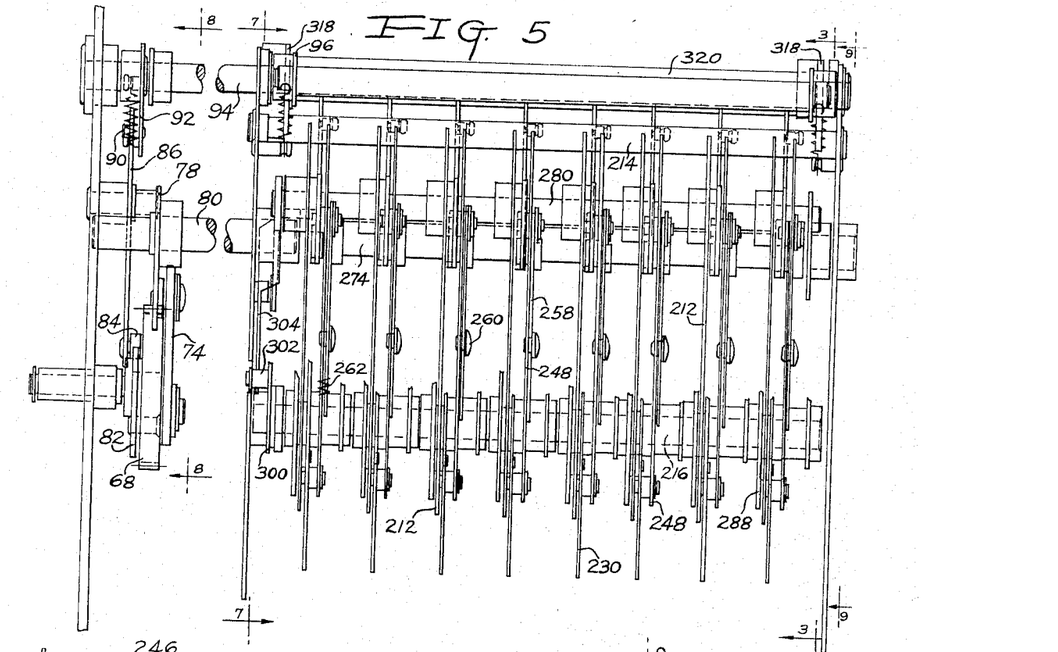
FIG. 5 is a horizontal sectional view showing another portion of the mechanism for setting the indicator rolls.
Figure 6:
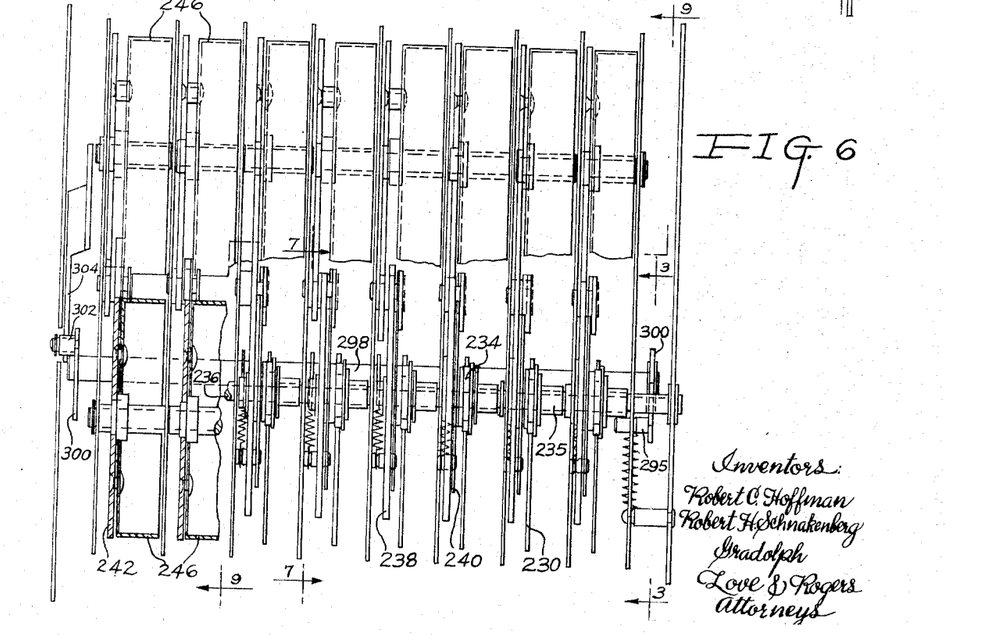
FIG. 6 is a sectional view showing a portion of the mechanism for setting the indicator rolls and showing the relationship of the indicator rolls and the means for operating them.

Each rack follower slide 146 has associated therewith a crossover arm 164. For illustrative purposes all of the arms 164 but only one slide 146 is shown in FIG. 2. Each arm 164 at its lower end is fitted with a pin 166 which extends through a slot 167 in the slide 146. Thus as the slide moves forwardly in the machine the distance permitted by the positioning of the stop pin 158, the arm 164 is pivoted in the clockwise direction a predetermined angular distance. At their upper ends the arms 164 are fixed to crossover shafts 168 which are pivotally mounted in the side plates 144 and a supplemental frame plate 169 and extend to the right thereof as seen in FIG. 4.

*Rack follower release and restore mechanism*

The main shaft 80 has fixedly mounted thereon a drive arm 170 at one end of which is a pivotally mounted roller 172 engageable in a cam slot 174 in yoke-shaped arm 176 fixed to an oscillatable shaft 178 journaled in the side plates 144. A pair of rack follower restore arms 180 are mounted on the shaft 178 and at their outer ends carry a restore bail 182 which is engageable with a face 184 formed on the rack follower slides 146. The arms 180 also carry the anchorage for the forward ends of the power springs 148 which hold the faces 184 against the bail 182 until the rollers 158 are contacted.

At the outset of each machine cycle the main shaft 80 is rotated in the clockwise direction an angular distance of 98° 50′ and in so doing the roller 172 is moved downwardly through dwell portion 173 to the bottom of the cam slot 174 thus pivoting the arm 176 in the counterclockwise direction, and this movement is transmitted to the oscillatable shaft 178 which moves the restore arms 180 in the counterclockwise direction. The bail 182 is thus moved away from the slide faces 184 a distance adequate to permit all of the arms 164 to be pivoted in the clockwise direction a distance sufficient to transmit the numerical data or other information from the rack bars 106. Because of the cam dwell 173 the bail 182 does not move immediately, and this delay gives the racks 106 time to set the rack followers 156 before the slides 146 contact them as shown by the second and third graph lines in FIG. 11. The power springs 148 move the slides 146 so that the stop faces 162 engage the stop pins 158 thus setting the crossover shafts 168 in angular positions indicative of the amounts to be set up on the visual indicator 32. The cam dwell 175 provides that the rack followers 156 and slides 146 are held in advanced position during the midpoint of the machine cycle.

On the second half of the machine cycle, as the main shaft 80 is being rotated in the counterclockwise direction an angular distance of 98° 50′, the roller 172 engaging the walls of the cam slot 174 rotates the arm 176 in the clockwise direction thus moving the restore arms 180 in the clockwise direction and the bail 182 engages the faces 184 driving the rack follower slides 146 to the start position shown in FIG. 2.

*Visual indicator roll sector setting mechanism*

The crossover shafts 168 extend rightwardly in the machine to positions under the visual indicator 32 (FIG. 4). To each of the shafts 168 there is secured a crossover clamp 186 which is slit down its longitudinal center and is formed with an opening in its upper end which may be squeezed tightly about the shaft 168 by means of a screw 188 threaded through the thickest portion of the clamp 186. At its lower end each clamp 186 is connected to a pin 190 which is pivotally connected in an opening in a connecting link 192. For illustration purposes the full complement of clamps 186 is shown in FIG. 3.

Figure 7:
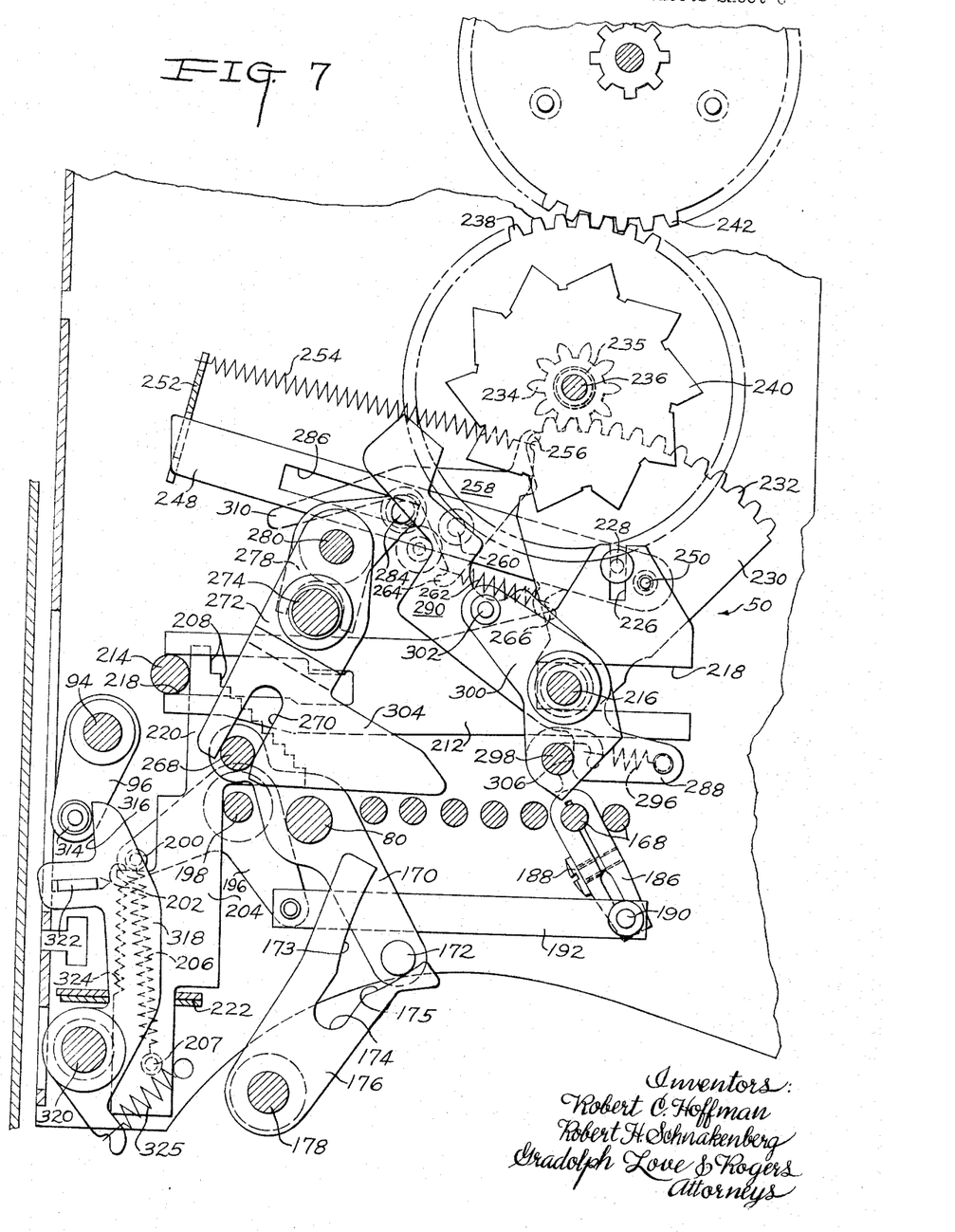
FIG. 7 is a view similar to FIG. 3, looking in from the left side of the machine and showing the indicator roll control mechanism in an intermediate position in the setting of one of the rolls in the position to indicate the numeral "9," and is taken along the lines 7—7 of FIGS. 4, 5 and 6, looking in the direction of the arrows.

At their rear ends the connecting links 192 are pivotally connected at 194 to one arm of a bell crank lever 196 pivotally mounted on a shaft 198. The opposite arm of the bell crank lever is fitted with a pin 200 adapted to bear against a shoulder 202 formed on the rear edge of a vertically movable sector stop slide 204. Springs 206 interconnecting the second arm of the bell crank lever 196 and a pin 207 adjacent the lower end of the slide 204 bias the bell crank lever 196 in the clockwise direction as seen in FIG. 3 and counterclockwise direction as seen in FIG. 7.

It is thus clear that the distance the stop slide 204 is moved downwardly is determined through the linkage described by the rearward movement of the actuators 104 and the rack bars 106 in the adding accumulating section 48. The position of the stop slide 204 thus determines the position of the dials in the indicator portion 32 of the cash register.

At its upper forward end a sector stop slide 204 is formed with a stairlike pattern providing a plurality of stop faces 208 having in value zero through nine in the ascending order of the stop faces 208. The stop faces are adapted to be engaged by a lateral flange 210 projecting from a stop positioning slide 212 which is mounted for transverse movement on a rear shaft 214 and a forward shaft 216 which project through slots 218 formed in the slide 212. At its upper rear the sector stop slide 204 has a vertical face 220 which rides against the shaft 214 to guide the slide 204 in its vertical movement and also to prevent its misalignment when one of the stop faces 208 is struck by the flange 210 of the sector positioning slide 212. At its lower end the face 220 terminates in a shoulder 222 which lies beneath the shaft 214 and limits vertical movement of the slide to the zero position, as shown in FIG. 3. The lower ends of the slides 204 are guided at 222.

At its forward end the sector positioning slide has an upwardly extending portion 224 with a vertical slot 226 formed therein. A pin 228 secured to the face of a gear sector 230 extends through the slot 226 and as the sector positioning slide 212 moves rearwardly of the machine the distance indicated by the position of the sector stop slide 204, the pin and slot connection rotates the gear sector 230 in the counterclockwise direction about its rotatable mounting on the shaft 216. The sector 230 has teeth 232 meshed with a pinion 234 fixed on a sleeve 235 rotatably mounted on shaft 236, the sleeve 235 carrying a larger gear 238 and a detent wheel 240. The gear 238 is meshed with a gear 242 in the roller mechanism so that the motion can be transmitted to position the amount indicating rolls 246 in known manner. The rolls 246 are arranged in the conventional crossover fashion so that the amount entered into the cash register, the transaction called for, and the like, can be visually observed simultaneously by the cashier or machine operator and the customer from opposite sides of the machine 20.

A link 248 has its forward end pivotally connected at 250 with the sector 230 in the vicinity of the pin 228 and its rearward end guided in a stationary comb 252. The link is biased rearwardly by a spring 254 which has one end anchored at the comb 252 and the other end connected to the projecting end 256 of a hook 258 pivotally mounted at 260 on the link 248. The spring 254 not only biases the hook to pivot in the clockwise direction about its pivotal mounting 260, but also tends to pull the link 248 rearwardly of the machine, and thus the gear sector 230 in the clockwise direction (FIG. 3) so that the sector positioning slide 212 is urged rearwardly to bring its flange 210 against one of the stops 208 in accordance with the indicated amount from the calculator section of the adding machine.

The hook 258 is biased in the clockwise direction (FIG. 3) and the counterclockwise direction (FIG. 7) by a second spring 262 interconnected between projections 264 on the hook and 266 on the link 248.

At the beginning of the machine cycle the drive shaft 80 rotates the drive arm 170 in the clockwise direction (FIG. 3) and in the counterclockwise direction (FIG. 7) so that a roller or pin 268 moves in a slot 270 in an L-shaped actuator arm 272 which is pivoted on shaft 274 which is rotatably mounted in suitable bearings in the side plates. As is noted from FIGS. 3 and 7, the pivotal mounting of the L-shaped arm 272 is not at the junction of its two arms, but is offset into arm 276 thereof a substantial distance.

The arm 276 of the L-shaped actuator 272 carries at its upper end an arm 278 on a pin 280, the arm 278 being L-shaped and having an open ended portion 282 embracing the shaft 274. At its upper end the arm 278 carries a pin and roller combination 284 engaged within a slot 286 in the link 248 to provide a lost motion connection between the actuator 272 and the link 248. When the drive arm 170 moves through its first half cycle of the machine, the actuator 272 is rotated in the counterclockwise direction (FIG. 3), thereby driving the pin and roller combination 284 forwardly to the FIG. 7 position so as to move the gear sector 230 to restore the amount indicating rolls 246 to the zero position which they will occupy at the midpoint of the machine cycle.

The indicating rolls 246 are retained in their set positions which they occupy only at the beginning and end of the machine cycle (FIG. 11) by the justifier detents 240 affixed to the shaft sleeves 235. The justifier detents or ratchets are somewhat star shaped and are individually engaged by pawls 290 rotatably mounted on the forward shaft 216.

The shaft 216 carries a bell crank 300 having a roller 302 at its upper end which is engageable by the second arm 304 of the actuator 272. When the actuator is moved into the FIG. 7 position, the arm 304 falls away from the roller 302 permitting spring 294 connected between a fixed anchor and a pin 295 on the bell crank 300 opposite the roller (FIG. 9) to rotate the bell crank 300 in the clockwise direction. The pawls 290 have tails 288 to which a spring 296 is fastened with the opposite end connected to a bail 298 carried by the bell crank 300. When the bell crank 300 is rotated, the pawls 290 are disengaged from the detents or justifier ratchets 240 permitting the actuator 272 to restore the indicator rolls 246 to the zero position at the midpoint of the machine cycle.

The disengaged position of the pawls 290 is determined by the bail 298 against which shoulders 306 on the pawls engage.

Thus, at the outset of every machine cycle, the drive arm 170 is moved in such direction by the main shaft 80 so as to move the actuator 272 from the FIG. 3 to the FIG. 7 position, thereby moving the pin and roller combination 284 moving in the slots 286 in the links 248 to drive all the gear sectors 230 to the zero position and at the same time the pawls 290 are disengaged from the justifier ratchets 240 or detents, thereby permitting the rolls 246 to be moved.

The hook 258 has a long arm 310 overlying the pin and roller combination 284 and it is forcibly brought thereagainst by the springs 254 and 262 and the function of this arm and the crotch 312 which it forms with the main body of the hook is to prevent bounce or chatter in the rolls 246 as they are moved between the numeral indicating position to zero position and back to a numeral or other indicia indicating position. The arm 310 has a restraining influence on too rapid a movement and also on overcarry and bounce-back.

Referring to FIGS. 8, 3 and 7, will be noted that at the outset of the machine cycle the shaft 94 is rotated in the counterclockwise direction by the action of the cam 82, lever 86 and bell crank 92. The shaft 94 carries an arm 96 which has a roller 314 at its lower end. The roller is in engagement with a face 316 and a justifier lever or arm 318. The justifier arms 318 are mounted on a shaft 320 and they carry a blade 322 therebetween which is adapted to engage teeth 324 on the rear face of the sector stop slides 204. At the outset of each machine cycle the cam 82 is shaped so as to cause the shaft 94 to be rotated to move the roller 314 rearwardly thereby permitting a spring 325 to rotate the arms 318 and therefore the blade 322 rearwardly and out of engagement with the teeth 324 on the sector stop slides 204. This permits them to be restored to the zero position by their springs 206 and also to permit the mechanism which has just been described to restore the amount or transaction indicating rolls 246 to the zero position for the midpoint of the machine cycle.

When the machine cycle has substantially completed its course, then the cam 82 operates the lever 86 and bell crank 92 to move the arm 96 to restore the blade 322 into engagement with the teeth 324, thereby to hold the sector stop slides 204 in the proper amount indicating position. At this same time it will be noted that the pawls 290 have been re-engaged with the justifier detents 240 and thereby the amount indicated will be held until the next transaction.

*Total taking indication*

The mechanism for operating the rolls 246 which give an indication of total, subtotal, total credit balance, and subtotal credit balance, is shown most clearly in FIGS. 2, 4, 9, and 10. The lever 332 is a part of the credit balance mechanism of the conventional adding and calculating machine and is mounted on a shaft 334 connected to be rotated by the mechanism indicated generally by the reference character 336 in FIG. 2. This mechanism forms no part of the present invention, and reference may be had to Thomas O. Mehan Patent No. 2,550,581, dated Apr. 24, 1951, for a better understanding and more complete disclosure of such mechanism. The lever 332 is pivotally connected to one end of a long link 338 which has a pivotal lost motion connection 340 with a short lever 342 fixed to a bell crank 344 in the indicator section of the machine.

Unless there is a credit balance in the total being taken, this last described mechanism is not operated.

The total taking key 40 is pivotally mounted at 346 and is connected to a control lever 348 by an angled link 350. The control lever is connected to control, in known manner, the functioning of the total taking mechanism in the adding and accumulating section 48. It is fixed on a shaft 352 to which is also fixed a generally triangular plate 354. At the apex opposite the shaft 352, the plate 354 is fitted with a pin 356 engaged in a slot 358 of an arm 360 secured on a pivoted shaft 362 to which is also secured a second arm having a pivotal connection at 364 with the upper end of a control slide 366, the lower end of which is slotted at 368 to receive a guide pin 370. The slide 366 is fitted with three pins, 372 for normal operation, 374 for total taking, and 376 for subtotal taking.

The pins 372, 374, and 376 are engageable by an L-shaped stop arm 378 upstanding from a midpoint of a long slide 380 guided on the pin 370 and a second pin 382. At its rear end face 384 is engaged by pin 386 carried at the lower end of bell crank 196. The bell crank 196 controls the sector stop slide 204 which controls the positioning of the sector 230 for the indicator roll 246 bearing the indicia for total, subtotal, total credit balance, and subtotal credit balance. The slide 380 is urged forwardly in the machine and the bell crank 196 through its operative movement by a long spring 388 interconnecting the bell crank pin 386 and the slide guide pin 382.

The slide 380 is moved forwardly and rearwardly an every cycle of the machine. The forward end of the slide 380 is formed with an arcuate face 390 held in engagement with a pin 392 carried on an arm 394 fixed on the main shaft 66 of the adding and accumulating section 48. Since this shaft is rotated 98° 50′ in the counterclockwise direction, and then the same distance on return, the spring moves the slide 380 forwardly on every machine cycle and it is returned by the movement of the pin 392 against the face 390.

Figures 9, 10:
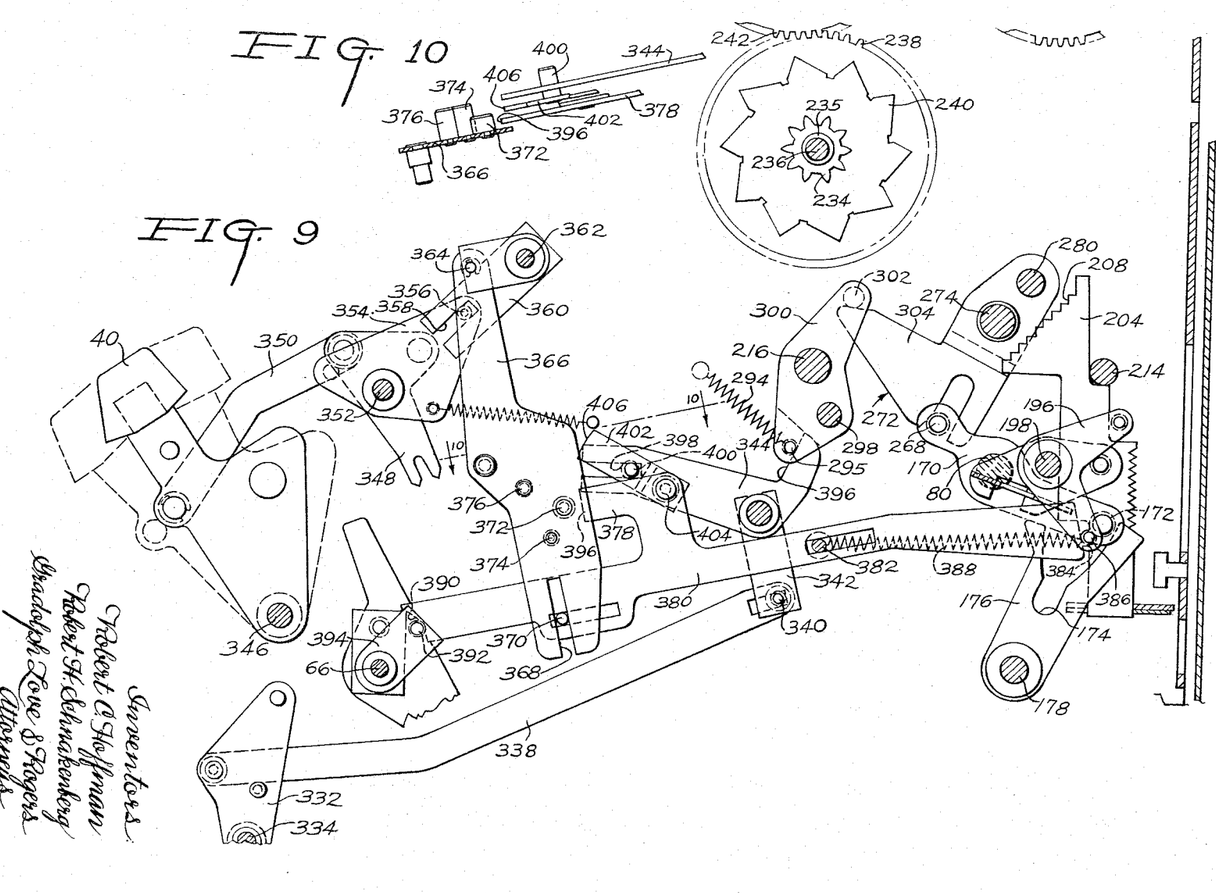
FIG. 9 is a view looking inwardly from the right side of the machine, showing the control linkage for positioning the rolls bearing the indicia of total, subtotal, credit balance total, and credit balance subtotal, and is taken along the lines 9—9 of FIGS. 4, 5 and 6, looking in the direction of the arrows.
FIG. 10 is a sectional view taken on the line 10—10 of FIG. 9, looking in the direction of the arrows.

If the total taking key 40 is not moved, the slide 366 will remain in the FIG. 9 position and face 396 on the slide 380 will strike the pin 372 to severely limit the movement of the slide 380 and the rotational movement of the bell crank 196 so that the total indicating roll 246 is not moved from its blank position. Should the total taking key 40 be moved forwardly, the slide 366 will be raised so the pin 374 is engaged by the stop face 396, permitting movement of the slide 380 and the bell crank 196 to set the total taking indicating dial 246 to total position. Should a subtotal be taken by moving the key 40 rearwardly, the slide stop face will strike the pin 376 and the dial 246 will indicate a subtotal.

In the event the accumulator 122 is in credit balance or negative total condition when a total or subtotal is taken, the credit balance lever will be rotated in the clockwise direction to move the link 338 rearwardly. This rotates the bell crank 344 in the counterclockwise direction, such movement being permitted since the pin 295 will have been moved away from bell crank face 396. The long arm of the bell crank 344 lies to one side of the L-shaped projection and has a slot 398 in its outer end in which a pin 400 is engaged. The pin 400 projects from one face of an auxiliary stop arm 402 pivotally mounted on the L-shaped projection 378. Under credit balance conditions, the bell crank 344 is rotated in the counterclockwise direction, and the pin 400 and slot 398 rotate the arm 402 in a position parallel to that of the upper arm of the L-shaped projection 378. The arm 402 has a stop face 406 which projects beyond stop face 396 in the down position of the arm 402. Thus, under credit balance conditions when taking either a total or a subtotal, the slide 380 will not be moved as far as it is moved in taking a total or a subtotal, and the indicating dial 246 will be set to show the appropriate symbol for total credit balance or subtotal credit balance, as the case may be.

Operation

Figure 11:
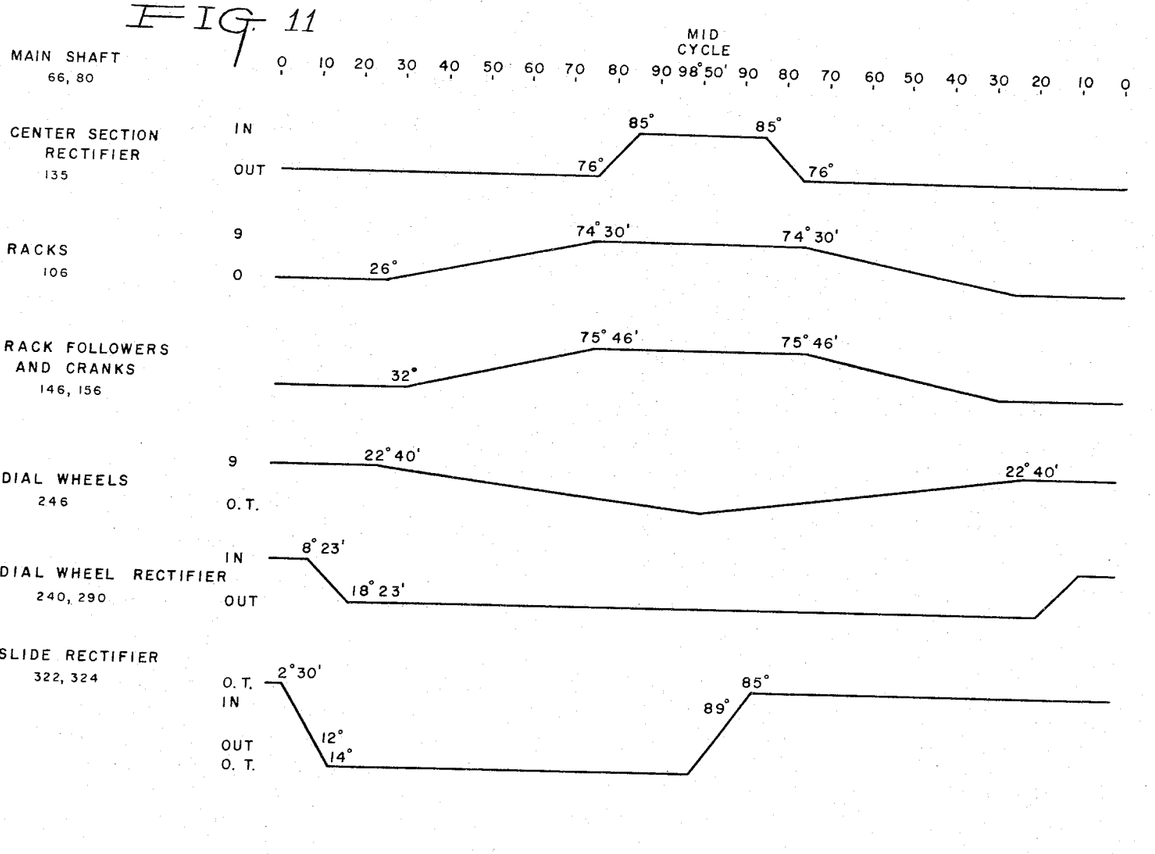
FIG. 11 is a graph indicating the timing of the operation of the various components of the machine and how they are interrelated to produce the desired results.

A typical transaction in a food store supermarket could well be illustrative of the operation of the visual indicator of the present invention and the operation will therefore be described with respect to such transaction and with particular reference to FIG. 11.

When the customer approaches the checkout counter, the final results of the previous customer's transaction will appear on the visual indicator 32. Let it be assumed that the new customer has a number of bottles to be returned for refund and that there are two or three different amounts for returned bottles for various products. Under these circumstances the checkout clerk depresses the appropriate number key 34, the subtract control key, and the appropriate transaction key 36 which would indicate the return of bottles for credit. The clerk then depresses the motor bar 38 and the machine cycles as previously described, with the actuators 104 moving rearwardly until stopped by the appropriate amount control keys 34 and carrying the rack bars 106. Through the previously described well known mechanism the appropriate amount is set up on the type 134 and through the linkage 150, 154 and slides 146 the appropriate amount is preliminarily set up for the visual indicator 32. The negative amount is also entered into the accumulator 122. It will be noted that both the main shafts 66 and 80 are initiated with the depression of the motor bar 38, that the center section rectifier 135 remains out of engagement until 76° of travel has occurred so as to permit setting the type sectors. The rack bars 106 begin their rearward movement at 26° with the rack followers 146 and cranks 156 beginning their movement somewhat later. However, the movement of the main shaft 80 releases the dial wheel rectifier mechanism 240, 290 at 8° 23′ after the beginning of the operation with the slide rectifier 322, 324 being disengaged at 2° 30′ after the beginning of the movement. Thus the dial rollers 246 are released for movement to zero shortly after the beginning of the cycle and they immediately spin to this position beginning their movement at 22° 40′ after the machine cycle begins.

After all of the machine parts have been disengaged for movement, there is a period of time between 32° when the rack followers and cranks begin their movement and 76° when the center section rectifier 135 engages the gear sectors 130 that all the parts in the machine are free to move, and it is during this period of time that the functions which have been heretofore described with respect to the various elements take place. During this time the slides 146 follow the cranks 156 under the force of the springs 148 and by virtue of the crossover shafts 168, the arms 186, and links 192 set the crank arms 196 to drive the stop slides 204 downwardly a distance appropriate to indicate the amounts to be entered into the cash register. The slides 212 and links 248 are driven forwardly to drive the indicator rolls to zero position. Prior to this the rectifier arms 290 were disengaged from the ratchet wheels 240 to free the latter so that they may be moved by the gear sectors 230. However, prior to the end of this movement the racks 106 stop their movement, the rack followers and cranks 146, 156 stop their movement and shortly after the midpoint of the machine cycle the slide rectifier 322, 324 is reengaged to stop the movement of the slides 204 and to lock them in their amount indicating position where they will be retained until shortly after the beginning of the next cycle.

On the return portion of the machine cycle these operations are reversed with the center section rectifier 135 disengaged so that the rack bars 106 may be restored forwardly in the machine to their locked positions. This permits the rack followers and cranks 146 and 156 to be restored to their positions. The dial wheels 246 are driven to the amount indicating positions by the slides 212 and links 248 under the force of the springs 254. The slide rectifier 322, 324 remains engaged with the slides 204, and the dial wheel rectifiers 240, 290 are returned to engaged position shortly before the end of the machine cycle thus holding the dial wheels in their last amount indicating positions.

This operation continues until the clerk has entered into the cash register all of the amounts to be refunded to the customer. At that point, depending upon whether the customer is to have this refund credited to his account or paid to him immediately, the operator moves the total subtotal key 40 in the appropriate direction. If the amount is to be returned to the customer, the key 40 is pulled in the forward direction and since a credit balance is indicated, the credit balance mechanism 336 will operate so as to indicate a negative total in the manner hereinbefore described. The bell crank lever 196 is operated to set the indicator wheels 346 for the proper amount, the slide 366 is pulled upwardly, and the bell crank arm 344 is pivoted so that it drops the stop extension arm 402 to engage the stop 374 on the slide 366 to indicate the credit balance total. The clerk then pays this amount to the customer and the transaction at this point is concluded.

However, if this is to be merely a preliminary stop in the whole transaction, then the clerk would push the total subtotal key 40 rearwardly thus indicating that a subtotal is to be taken. The mechanism would operate in the manner described except that the slide 366 is moved downwardly and the stop arm 402 is dropped into position so that its end 406 engages the stop pin 376 thus limiting the movement of the slide 380 to indicate that a credit balance subtotal is taken and the appropriate dials 246 appear in the indicator 32.

As the clerk enters the various sales items into the cash register, she depresses the appropriate numeral keys 34 for each transaction and the appropriate code key 36 to indicate perhaps produce, canned goods, bakery goods, meat, etc. and operates the motor bar 38 on each item rung up.

This has the effect as previously described of spinning the rolls 246 to the zero position at the midpoint of each machine cycle and then to indicate the amount entered in the cash register at the end of each cycle in precisely the same fashion as described above. However, during these cycles the credit balance mechanism 336 is not operated and consequently the link 338 remains in its normal position. However, the main shaft 66 cycles at every stroke of the machine and consequently the slide 380 is permitted to move leftwardly, FIG. 9, under the force of the spring 388. Its stop face 396 engages the pin 372 on the slide 366 thus limiting the movement of the slide 380 and the roll 246 indicating total, subtotal and the credit balance for total and subtotal is not operated and remains in blank position.

At the end of the operation the clerk will take a subtotal and in doing so will push the total subtotal key 40 rearwardly thus lowering the slide 366 and in this case the figure entered into the machine is not a credit balance and consequently the stop face 396 when the motor bar 38 is depressed engages the stop pin 376 to indicate a subtotal. Let it be assumed that this subtotal indicated is $15.93. In the event the customer hands the clerk a twenty dollar bill, the clerk enters the twenty dollar bill into the machine and operates the subtract key so as to obtain the amount to determine how much change the customer would get. On the next machine cycle the amount of $20.00 is entered as a negative value into the accumulator 122. On the last cycle the clerk moves the total taking key 40 forwardly for the purpose of taking the total, the slide 366 is raised and since a credit balance is to be indicated, the bell crank 344 is operated through the link 338 and the stop face 406 engages the stop 374 to give the amount of $4.07 which is the change the clerk should hand the customer.

In the event that there was a sales tax to be added in this transaction, this would be calculated from the chart held in the holder 42 and would be entered into the machine as a positive transaction immediately after taking the first subtotal in which case a second subtotal would be taken before the change would be calculated.

It is thus seen from the foregoing description that the objectives which were claimed for this invention at the outset of this description have been obtained by the apparatus disclosed.

While a preferred embodiment of this invention has been shown and described, it will be apparent that numerous variations and modifications may be made without departing from the underlying principles of this invention. It is therefore desired, by the following claims, to include within the scope of the invention all such modifications and variations by which substantially the results of this invention may be obtained through the use of substantially the same or equivalent means.

What is claimed as new and desired to be secured by United States Letters Patent is:

1. In a cash register having visual amount and transaction indicating rolls, amount setup keys, and movable actuators whose movements are controlled by the amount setup keys, the combination comprising, a pivotally mounted gear sector for each indicating roll, means connected to said gear sector for moving it, a first slide connected to said gear sector for determining its movement, a second slide having movement limiting means thereon engageable by said first slide to limit the movement thereof, a third slide, linkage means interconnecting said second and third slides, settable stop means engageable by said third slide, linkage means interconnecting one of the actuators and said stop means to position said stop means according to the amount set up by one of the amount setup keys, spring means connected to said third slide to move it into engagement with said settable stop means whereby said second slide is positioned to be engaged by said first slide to determine the movement of said gear sector, and power means connected to said third slide and to said gear sector moving means to move them to zero position.

2. The combination set forth in claim 1, including an oscillatable powered driving member forming a part of said power means.

3. The combination set forth in claim 1, including a justifier means for each indicating roll which in engaged position holds the roll against movement.

4. The combination set forth in claim 3, wherein said justifier means for each indicating roll includes a rotatable detent wheel and a pivotally mounted pawl engageable with said detent wheel, and means biasing said pawl out of engagement with said wheel.

5. The combination set forth in claim 4, including an oscillatable driving member forming a part of said power means, an arm movable between two extreme positions between the beginning, midpoint and end of a machine cycle and operated by said oscillatable driving member, and pawl control means engageable by said arm to overcome the effect of said biasing means and to hold said pawl in engagement with said rotatable detent wheel during the time between shortly before the end of a machine cycle until shortly after the beginning of the subsequent machine cycle.

6. The combination set forth in claim 1, including a justifier means for said second slide which in engaged position locks said slide against movement.

7. The combination set forth in claim 6, including a cam driven through a single revolution for each machine cycle, linkage means operated by said cam and connected to operate said slide justifier means to move said slide justifier means to disengaged position and to hold it in disengaged position until the midpoint of the machine cycle, and means restoring said justifier means to engaged position.

8. The combination set forth in claim 7, wherein said slide justifier means comprises a row of teeth on said second slide and a blade movable into and out of engagement with said teeth, and said restoring means comprises a spring urging said blade into engagement with said teeth.

9. The combination set forth in claim 2, including a bail holding all of said third slides out of engagement with said settable stop means, an arm moving said bail between two extreme positions, and a cam fixed to said arm for moving the latter and having an operating portion between two dwell portions to prevent movement of said third slide at the beginning, the midpoint and the end of the machine cycle to prevent movement of said third slide until after the actuators have begun their movement so as to prevent interference with the movement of the actuators, said oscillating driving member engaging and operating said cam during the machine cycle.

10. The combination set forth in claim 9, including a pivotable actuator follower carrying said settable stop means at one end, and a link connecting the other end of said follower with the actuator.

11. In a cash register having a visual transaction indicating roll to indicate appropriate total conditions, an accumulator, a credit balance mechanism, and a total taking key, the combination comprising, a pivotally mounted gear sector for the indicating roll, means connected to said gear sector for moving it, a first slide connected to said gear sector for determining its movement, a second slide having movement limiting means thereon engageable by said first slide to limit the movement thereof, a third slide, linkage means interconnecting said second and third slides, settable stop means engageable by said third slide, said settable stop means having a neutral position, a total taking position, and a subtotal taking position which are controlled by the position of the total taking key, spring means connected to said third slide to move it into engagement with said settable stop means, and power means connected to said third slide and to said gear sector moving means to move them to start position.

12. The combination set forth in claim 11, wherein said third slide has a first stop face engageable with said settable stop means in neutral position, in total taking position and in subtotal taking position, a second stop face movable into position for engagement with said settable stop means in total taking position and in subtotal taking position, and linkable means interconnecting the credit balance mechanism and said second stop face to move the latter into stop means engaging position when a credit balance total taken from the accumulator is to be indicated.

13. The combination set forth in claim 11, wherein said settable stop means are mounted on a fourth slide, and linkage means interconnects the total taking key and said fourth slide.

14. The combination set forth in claim 11, wherein said power means connected to said third slide is driven from a first powered main shaft and said power means connected to said gear sector moving means is driven from a second powered main shaft.

References Cited

UNITED STATES PATENTS

| | | | |
|---|---|---|---|
| 1,240,234 | 9/1917 | Martin | 235—23 |
| 1,870,234 | 8/1932 | Bryce | 235—23 |
| 2,107,033 | 2/1938 | Garbell | 235—23 |

RICHARD B. WILKINSON, *Primary Examiner.*

S. A. WAL, *Assistant Examiner.*